Oct. 14, 1969  A. E. ABRAMSON ET AL  3,472,721
APPARATUS FOR LAP JOINDER OF PLASTIC SHEETS
Filed Jan. 24, 1966  8 Sheets-Sheet 1
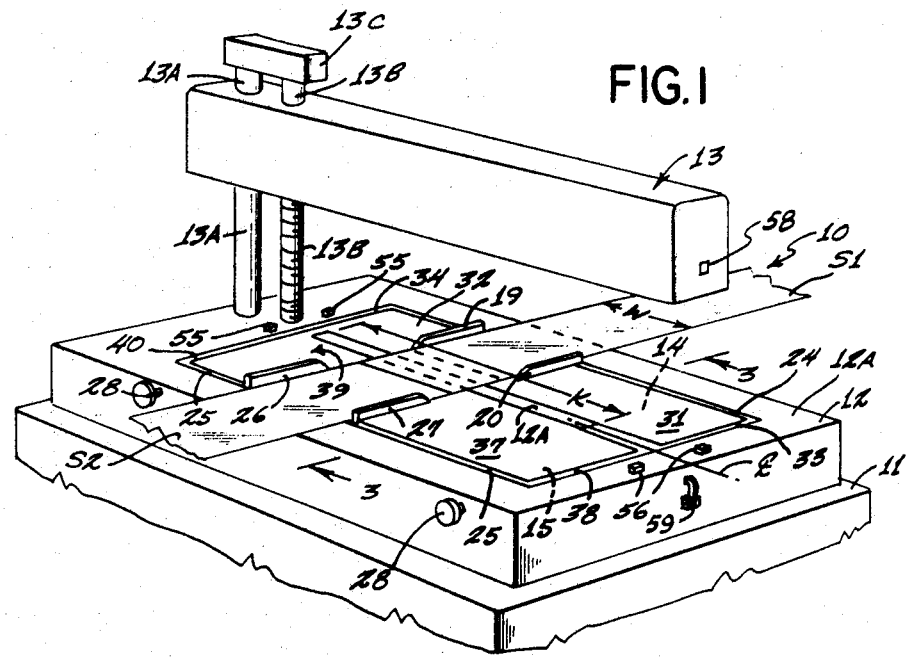
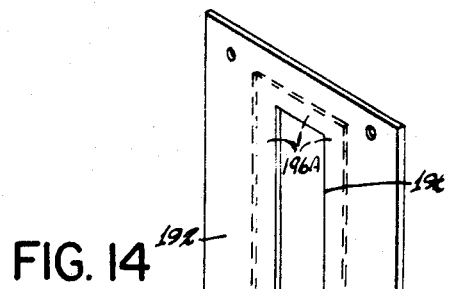
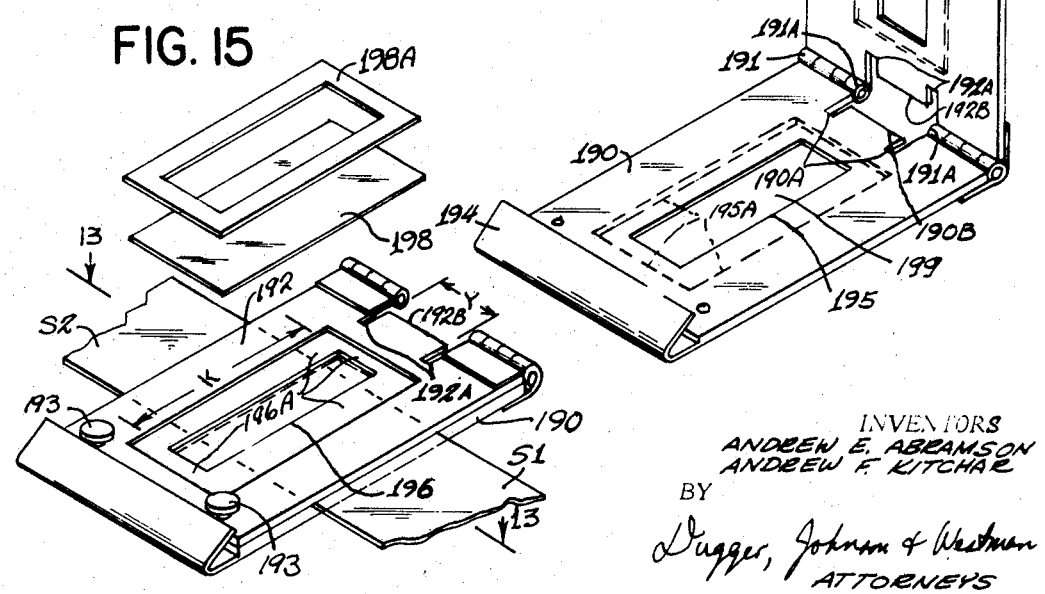
INVENTORS
ANDREW E. ABRAMSON
ANDREW F. KITCHAR
BY
Dugger, Johnson & Westman
ATTORNEYS

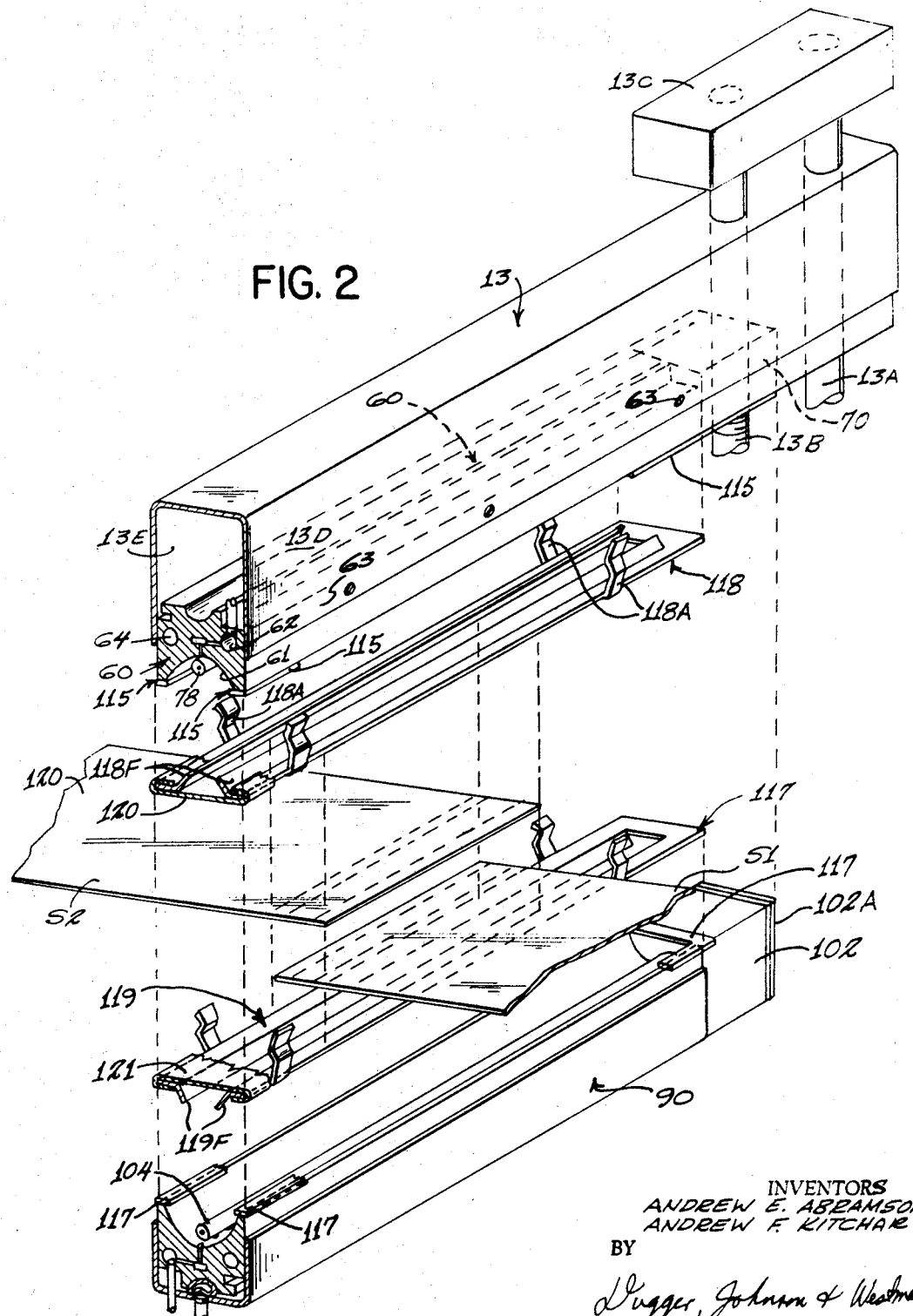

Oct. 14, 1969   A. E. ABRAMSON ET AL   3,472,721
APPARATUS FOR LAP JOINDER OF PLASTIC SHEETS
Filed Jan. 24, 1966   8 Sheets-Sheet 3

INVENTORS
ANDREW E. ABRAMSON
ANDREW F. KITCHAR
BY
Dugger, Johnson & Westman
ATTORNEYS

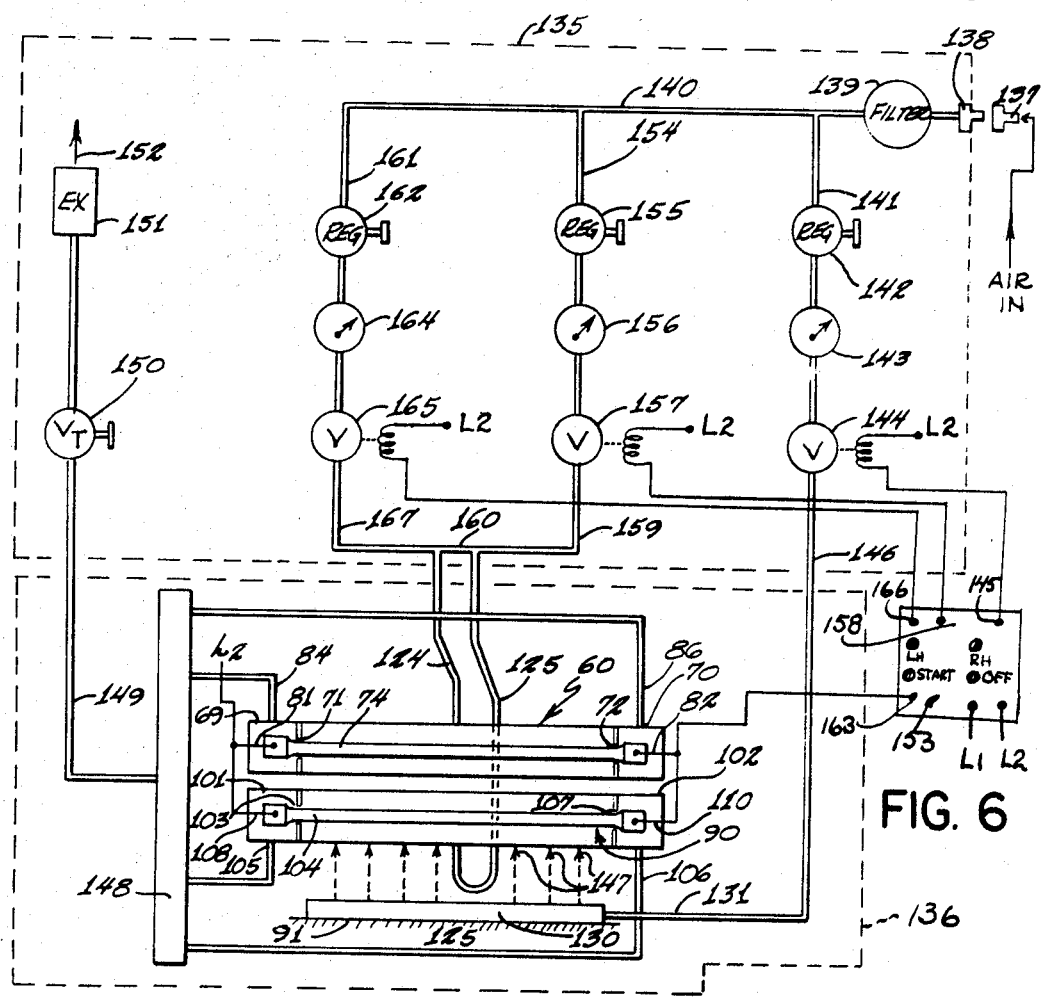

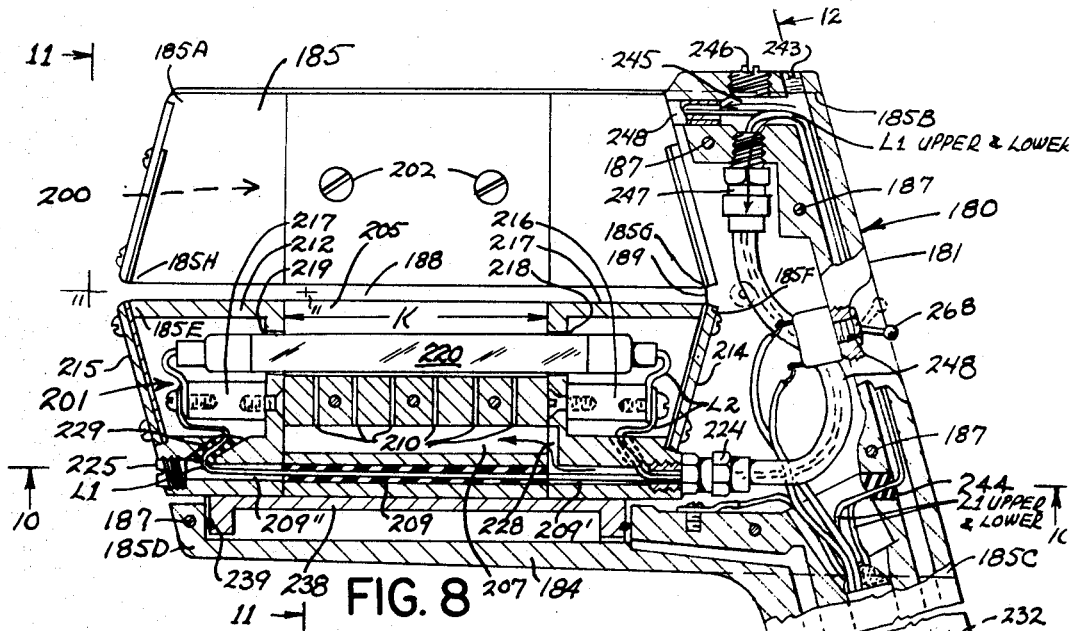
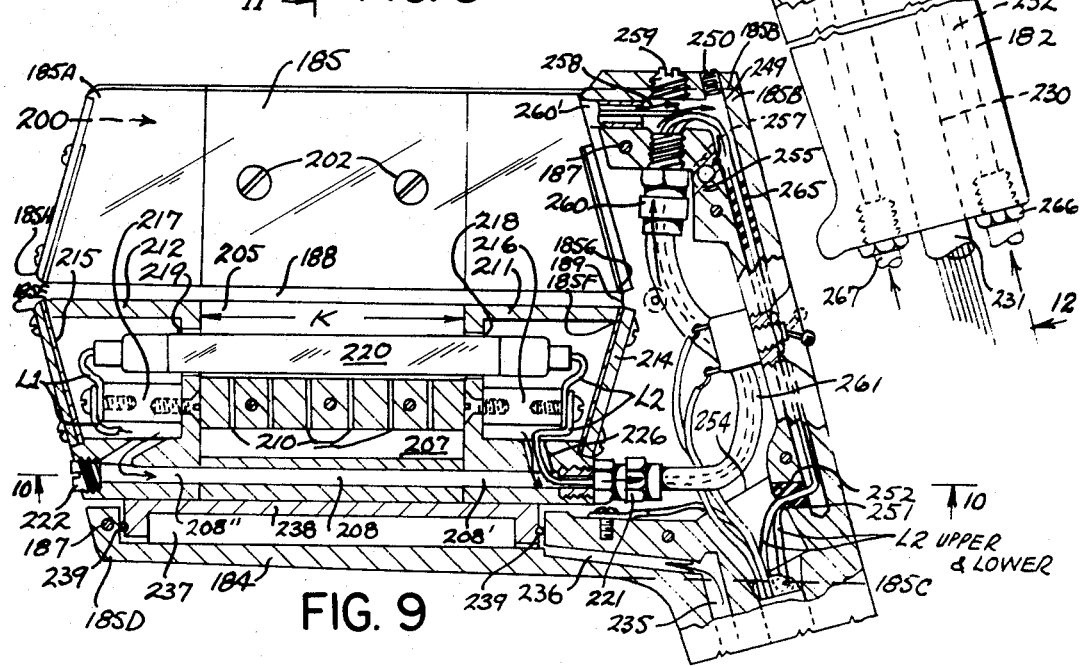
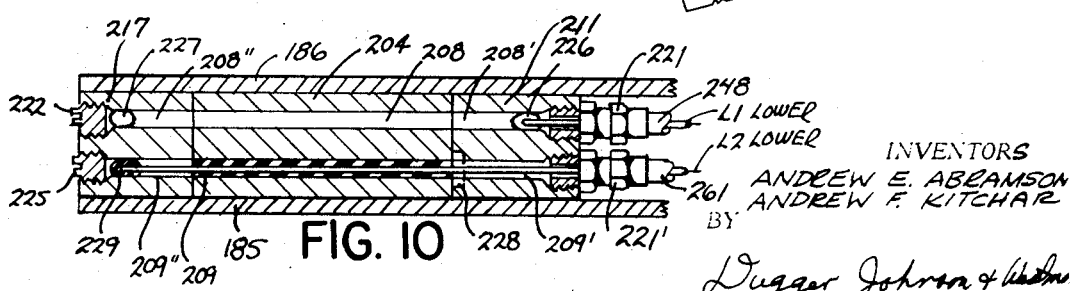

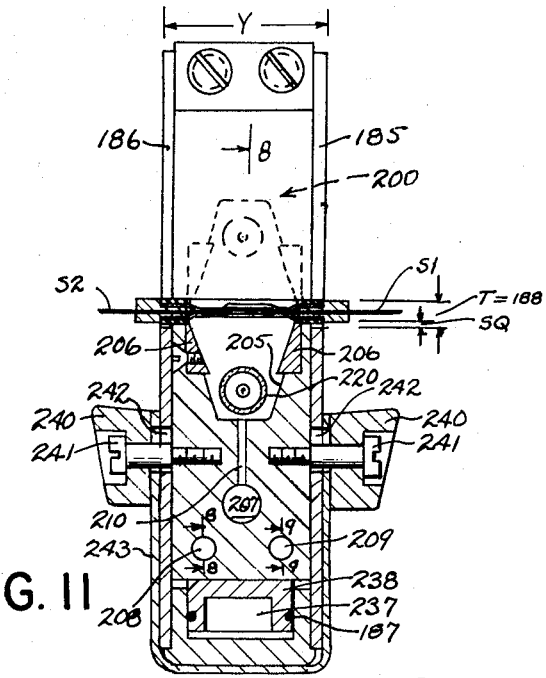

United States Patent Office 3,472,721
Patented Oct. 14, 1969

3,472,721
APPARATUS FOR LAP JOINDER OF PLASTIC SHEETS
Andrew E. Abramson and Andrew F. Kitchar, Excelsior, Minn., assignors, by mesne assignments, to Research, Incorporated, a corporation of Minnesota
Filed Jan. 24, 1966, Ser. No. 522,786
Int. Cl. B65h *21/00;* B32b *31/20*
U.S. Cl. 156—366                                27 Claims

ABSTRACT OF THE DISCLOSURE

Plastic sheet lap welding apparatus having a pair of units that are movable toward each other, each unit having a chamber opening toward the other and a heat source in the chamber. Diaphragms are provided to close the chambers and to be flexed by pressurized fluid in the chambers to clamp plastic sheets between the diaphragms while heat radiations are emitted through said diaphragms to said sheets. One embodiment is a hand held unit while the other embodiment is incorporated as part of a machine that has guides for aligning the sheets and boxes having apertured covers through which a negative pressure is applied to hold the sheets in position to be clamped by the diaphragms on said units.

---

This invention relates to method and apparatus for joinder of plastic sheets, and particularly for joining the edges of plastic sheets by lap welding. The invention has a special applicability for the lap welding of the edges of high and low temperature resistant plastic sheets.

It is an object of the invention to provide method and apparatus for the welding of the lapped edges of plastic sheets, and particularly for the lap welding of the ends of plastic strips.

It is a further object of the invention to provide a machine capable of lap welding the edges of wide or narrow plastic sheets and especially plastic sheets which are capable of withstanding very high temperatures.

It is another object of the invention to provide a machine for the automatic lap welding of the edges of plastic sheets and to provide a machine which may be portable or hand held for so doing.

It is another object of the invention to provide method and apparatus for the lap welding of plastic sheets by means of radiant heating.

Other objects of the invention include methods and apparatus for simultaneously heating and applying pressure to superimposed plastic sheets for welding them together; for heating plastic sheets by radiant heat energy applied against opposite faces of such sheets and for welding plastic sheets by applying radiant heat energy through a heat transmitting diaphragm while pressing the diaphragm with fluid pressure against the sheets to be welded.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 1 is an isometric view of one exemplary form of the invention for lap welding of the lapped ends of wide or narrow plastic strips;

FIGURE 2 is an isometric view of portions of the apparatus shown in FIGURE 1, with the parts separated and with the gaskets removed; FIGURE 2 is shown partly in vertical section;

FIGURE 6 is a schematic diagram showing the pressure circuit of the apparatus of the invention;

FIGURE 7 is a graph showing the timing diagram of the method and apparatus of the present invention;

Figure 3:
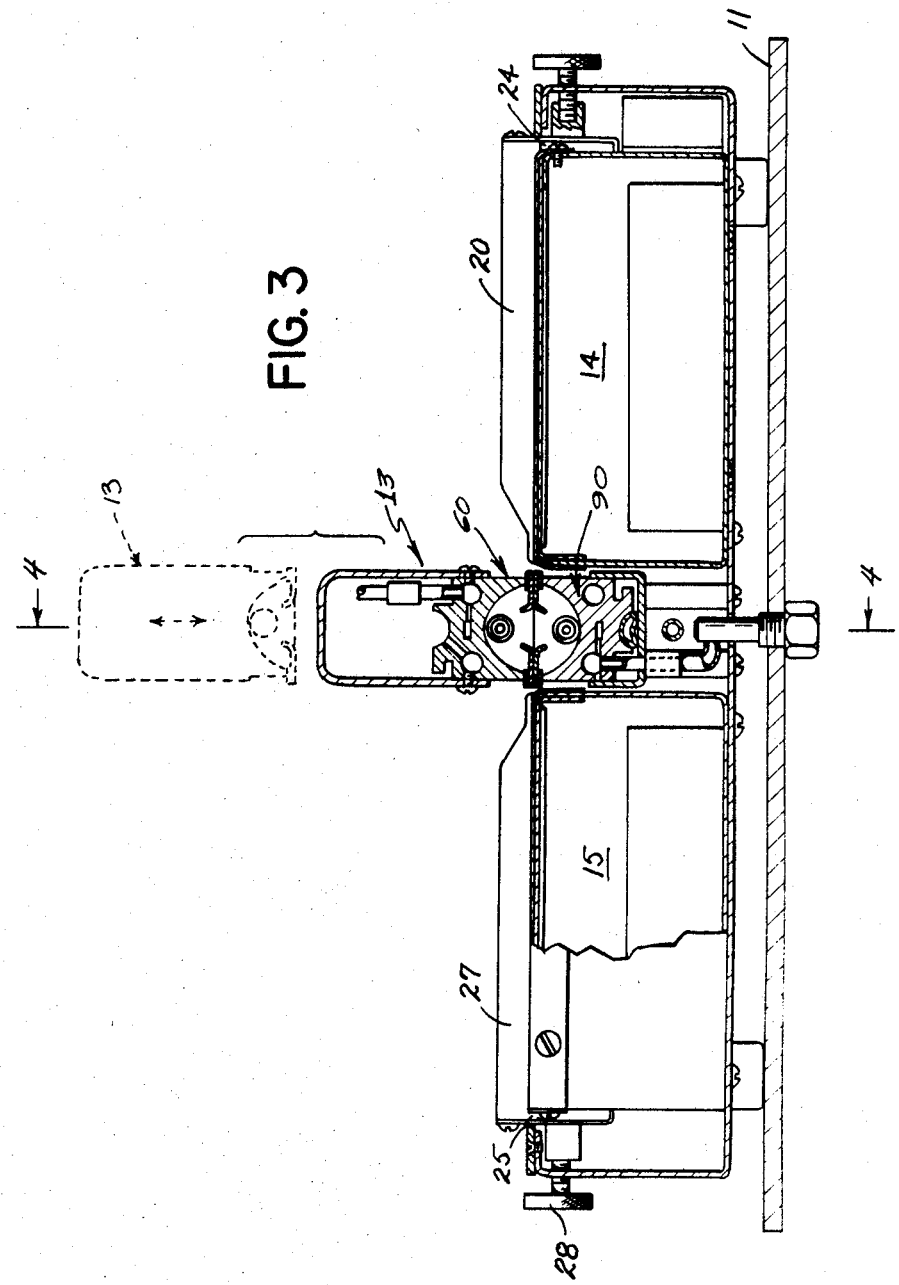
FIGURE 3 is a sectional view taken through the apparatus of FIGURE 1, the section being shown in a vertical plane at and in the direction of arrows 3—3 in FIGURE 1.

FIGURES 8–16 illustrate another embodiment of the invention for sealing together the ends of strips of plastic. FIGURES 8 and 9 are side elevational views, partly in section. In these figures the sections are on the centerlines except in FIGURE 8 the section jogs over to passage 208 (arrows 8—8 of FIGURE 11 and arrows 8–8/9 of FIGURE 12). FIGURE 10 is a horizontal section, looking upward in the direction of arrows 10—10 of FIGURES 8 and 9. FIGURE 11 is a front elevation with the lower portion in section at the line and in the direction of arrows 11—11 of FIGURE 8. FIGURE 12 is a rear vertical sectional view taken at the line and in the direction of arrows 12—12 of FIGURE 8. In FIGURE 12, the side plates are not shown. FIGURE 13 is an enlarged fragmentary sectional view of the central portion of FIGURE 11. FIGURES 14 and 15 are isometric views of the diaphragm carrier and strip clamping device, FIGURE 14 being an "open" view and FIGURE 15 a "closed" view but with the diaphragm and gasket of one member separated. FIGURE 16 is a sequence diagram.

Throughout the drawings, corresponding numerals refer to the same parts.

The present invention is related to the inventions disclosed and claimed in our applications entitled "Machine Alignment in Strip Joining," Ser. No. 522,751, and "Apparatus for Strip Trimming Preparatory to Lap Joinder" Ser. No. 522,752, now U.S. Patent 3,354,769, both executed and filed of even date herewith.

According to the method of the present invention, plastic sheets, which may be in strip form, which are to be joined are positioned so as to have their edges in overlapping relationship, and when so overlapped, the plastic sheets are welded autogenously at the lap, and thereby fastened together. Heating of the plastic sheets, sufficient to cause autogenous welding of the sheets, is accomplished by simultaneously projecting radiant energy against both sides of the lapped sheets, so as thereby rapidly to elevate them to softening temperature sufficient to accomplish the welding. Simultaneous with the heating of the lapped portions of the sheets they are firmly pressed together by fluid pressure, applied to the outer surfaces of the plastic sheets where they are lapped, and the contacting plastic surfaces of the lapped sheets at the interface of the lap are accordingly pressed firmly against each other while in the tacky condition induced by radiant heat energy penetrating into the lap interface from both directions.

For applying the pressure to opposite faces of the two sheets where they are lapped, according to this invention there are utilized two diaphragms which are also sheets of plastic material. These diaphragms are of sufficient area to more than cover the lapped portion where welding of the two sheets of plastic is to be accomplished. These two plastic diaphragm sheets are flexible, and by applying fluid pressure, preferably air pressure, against the outer faces of the diaphragm sheets, these are caused to flex in towards each other and thereby press against the area of the lapped edges of the sheets which are to be welded. Provision is made for carefully equalizing the fluid pressure which is applied to the outer faces of the two diaphragm sheets which press together the area of the lapped edges of plastic sheets which are to be welded. This is done so as not to cause bursting of the diaphragm sheets. These diaphragm sheets are made very thin and are transparent or nearly transparent in respect to the radiant heating energy which is applied directly through them and into and against the lapped edges of the plastic sheets which are to be welded. The diaphragm sheets will, however, be heated to some extent, just as are the lapped sheets being welded. However, we have found that heating of the plastic sheets being welded is principally concentrated at the interface between such sheets.

According to the present invention it has been discovered that the diaphragm sheets are thin and flexible, may be made of the same plastic material as the sheets which are to be welded, and yet, by provisions suitably made as described below, they will not become sufficiently hot to become tacky, whereas, during the welding procedure the lapped edges of the same kind of plastic sheets being welded will become hot enough to become tacky and weld together. This is accomplished by cooling the diaphragm sheets by projecting against the outer surfaces thereof (where fluid pressure is applied to them) a turbulent flow of cooling fluid, preferably air. This cooling fluid (which is the same fluid as applies the pressure to the diaphragms) sufficiently cools the diaphragms so that even though the same radiant energy passes through them as passes into the lapped edges of the plastic sheets being welded, the diaphragm sheets will be become sufficiently heated as to lose their mechanical integrity or become tacky, and the diaphragm sheets will accordingly accept and withstand the fluid pressure which is applied against them.

To assist in preventing adhesion of the diaphragm sheets to sheets being welded, we prefer to apply to the surface of the diaphragm sheets a thin transparent coating of high temperature resistant "parting compound" such as silicone resins, which can be lightly applied as a spray coat, and then polished.

While the invention is applicable to welding of the lapped edges of plastic sheets composed of plastics of widely varying softening (or melting) point temperatures, the invention is especially adapted for welding togteher the lapped edges of plastic sheets such as "Du Pont" (trademark) "Kapton (trademark) Type HF" (which has a welding coating thereon) and similar plastic materials which have very high melting points, as compared with many other plastic materials.

In carrying out the methods of the invention we prefer to accomplish this by first lapping the edges of the plastic sheets which are to be welded together, and then placing the lapped edges in a position so that they will be engaged by the two diaphragms of plastic materials as aforementioned. The diaphragm sheets are so arranged that fluid pressure may be applied against their outer surfacs so as to cause them to flex towards each other and apply pressure against the area of the lapped edges of the sheets which are to be welded together. Air which may be entrapped between the sheets being welded together is squeezed out. Pressure so applied is done initially, and then while such application of pressure is continued radiant heat sources, in close proximity to the diaphragms, are energized and the radiant energy is directed through the diaphragms and into the plastic sheets of which the lapped edges are to be welded. Radiant energy is applied through both of the diaphragms which, of course, are transparent or nearly so, and such heat energy passes from both directions through and into plastic sheets at the lapped edges, and quickly elevates the temperature of such plastic sheets at the lap. The clear plastic diaphragms are meanwhile cooled by jets of air which produce cooling of the surface (and hence the body) of such transparent diaphragms, so as thereby to prevent them from reaching a sufficiently elevated temperature as to destroy their mechanical integrity. The energization of the radiant energy sources is accurately timed, so as just to elevate the temperature of the lapped edges sufficiently so as to soften the plastic and cause the sheets to weld together where they are firmly pressed by the pressure of the opposed diaphragms pressing against them. The energization of the radiant heating sources is then interrupted but pressure is continued to be applied by the diaphragms until the lapped edges of the plastic sheets which are now welded together, are cooled to a temperature below fusion temperature and then the pressure applied against the diaphragms is released, and they withdraw from contact with the outer surfaces of the now welded lapped edges, and the operation is thereupon complete.

The time that pressure is applied prior to energization of the radiant heating sources may be widely varied, but in an exemplary cycle of operation the pressure is first applied to the lap for several seconds. Then the radiant energy sources are energized for a period from one to sixty seconds, depending upon the thickness and type of plastic sheets which are to be welded together, and the strength of the radiant energy sources. In an exemplary case, the radiant energy sources may be energized for example for ten seconds.

If desired, the pressure applied by means of the transparent diaphragms may be increased during the period in the cycle during which the lapped edges of the plastic sheets are being heated by the radiant energy heat sources, and such increased pressure is then maintained until after de-energization of the radiant energy heat sources and until the welded lapped edges of the plastic have had an opportunity to cool to a temperature below fusion temperature of the plastic. Thus in a specific example, lapped edges of Kapton (trademark) sheeting were pressed together by the diaphragms, utilizing for example zero to approximately twenty-five pounds per square inch pressure during the first ten-twelve seconds of the heating cycle, and then the pressure increased to around seventy-five pounds per square inch during the remainder of the heating period which for example may be eighteen seconds total. The higher pressure was thus maintained until the now welded lapped edges had cooled, i.e. until about thirty seconds total had elapsed, after which the operating cycle is complete. This is merely an example of a timing cycle that may be used pursuant this invention, and is not a limitation.

In another example, the lapped edges of Kapton plastic sheeting were pressed together and the radiant energy heating sources simultaneously energized with the application of pressure. Then the heating sources were de-energized while maintaining the same constant pressure applied by means of the transparent flexible diaphragms to the edges undergoing welding, and then released.

An exemplary embodiment of a machine of the invention is shown in FIGURES 1-6. Some features of this machine are disclosed and claimed in our co-pending application entitled Machine Alignment in Strip Joining, Ser. No. 522,751 and our co-pending application entitled Apparatus for Strip Trimming Preparatory to Lap Joinder, Ser. No. 522,752. These applications were executed and filed of even date hereof, and their disclosures are incorporated herein by reference.

The machine shown in FIGURES 1-6 includes a stand 11 on which the welding machine base 12 (or platform) is adapted to be positioned and supported. The base 12 is in the form of a box having a flat upper work surface 12A. Inset into box 12 are devices for aligning and holding flat the two strips S1 and S2 of plastic the ends of which are to be lap welded together. Briefly the apparatus for holding the strips and aligning them consists of two boxes 14 and 15, which are set into the platform 12 so the upper surfaces of the boxes are level with surface 12A. The box 14 is bounded by the slots 33, 24 and 34. The box 15 is bounded by the slots 38, 25 and 40. These boxes each have an upper surface composed of screen wire or other material which permits the passage of air downwardly therethrough, and the boxes are provided with guides as at 19 and 20 for box 14 and 26 and 27 for box 15. The guides are brought into engagement with the edges of the strips S1 and S2 and help align the strips during the lap welding operation. The guides 19 and 20 may be moved along the slot 24, and held in any position by a suitable clamping screw, not shown in FIGURE 1. Similarly the guides 26 and 27 may be moved to any position along the slots 25 and they may be locked in position by the clamping screws 28—28. There are provided covers 31 attached to guide 20 and 32 attached to guide 19, and cover 37 attached to guide 27 and 39 attached to guide 26 which are adapted to be drawn over those portions of the upper surfaces of the boxes 14 and 15 respectively which are not covered by the plastic sheets that are being welded together (i.e. the portions between the guides). The covers keep the air from being drawn down through those portions of the upper surfaces of the box at 14 and 15 that are not covered by the strips S1 and S2, and hence vacuum, applied to the interior of boxes 14 and 15 selectively, is concentrated on the plastic sheets S1 and S2 and effectively holds them in position. In FIGURE 1 the sheets S1 and S2 are shown as overlapped, and this is the form of welding which is principally adapted to be performed by this invention. The lap occurs over a central area 12A, between the boxes 14 and 15, this area having a dimension K, which is the maximum dimension of lap sheets adapted to be welded together by the particular machine shown in FIGURE 1.

On the base 12 there is a post at 13A and a screw post at 13B. At the top of post 13A there is a cross member 13C which serves as a top journal for the screw post 13B. The upper member 13 is a welding member which cooperates with another welding member in box 12, situated in area 12A. This member 13 slides up and down on the post 13A, and it is moved by the screw 13B. By means of a motor drive and suitable controls, not illustrated, the screw 13B may be rotated in one direction or the other, and in so doing the upper welding member 13, shown elevated in dotted lines in FIGURE 3, may be brought down to the position shown in full lines in FIGURES 3 and 5, which is the position assumed during the welding operation. In this welding position the under surface of the member 13 contacts with the similar equipment in the area 12A, as will be described, to accomplish the welding operation. On the front end of the upper welding member 13 there is an aperture 58 into which a manually operated hook member 59, fastened on the front surface of the base 12, is adapted to be inserted for latching. This holds the front end of the member 13 from upward deflection during the welding cycle during which pressure is applied which would tend to separate them. It is preferred that suitable electrical interlocking control, not illustrated, be operated by the latch 59 when it is in latching position in the aperture 58, so that the welding cycle cannot be initiated until latch 59 is in latching position and also so that screw 13B may not be energized to (attempt to) raise element 13. This prevents the motor driven screw from imposing inordinate forces on the member 13, which is mechanically held down by the latch 59 during the welding operation. In short the latch 59 must be latched to initiate the actual welding cycle and must be unlatched before the member 13 can be raised by motor operation and the suitable interlock switches, not shown, operated by latch 59 are provided to insure such mode of operation.

Figure 4:
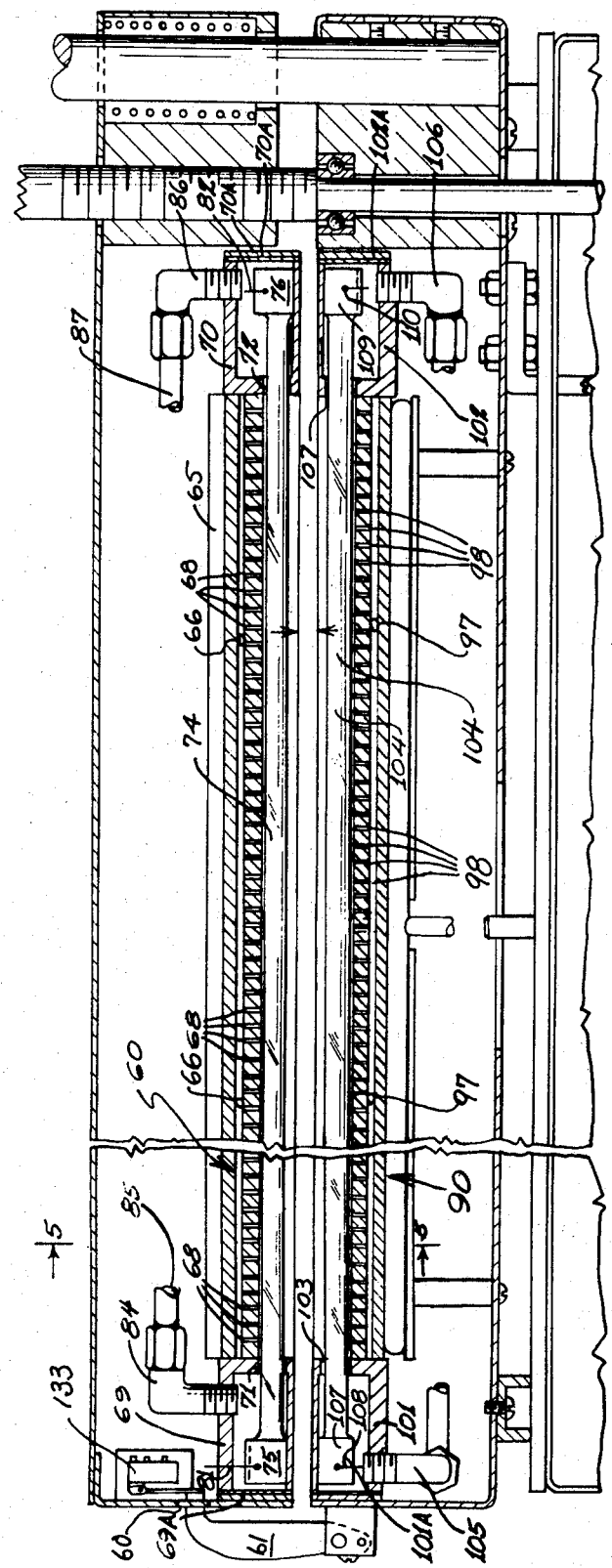
FIGURE 4 is a vertical sectional view taken along the line and in the direction of arrows 4—4 of FIGURE 3.
Figure 5:
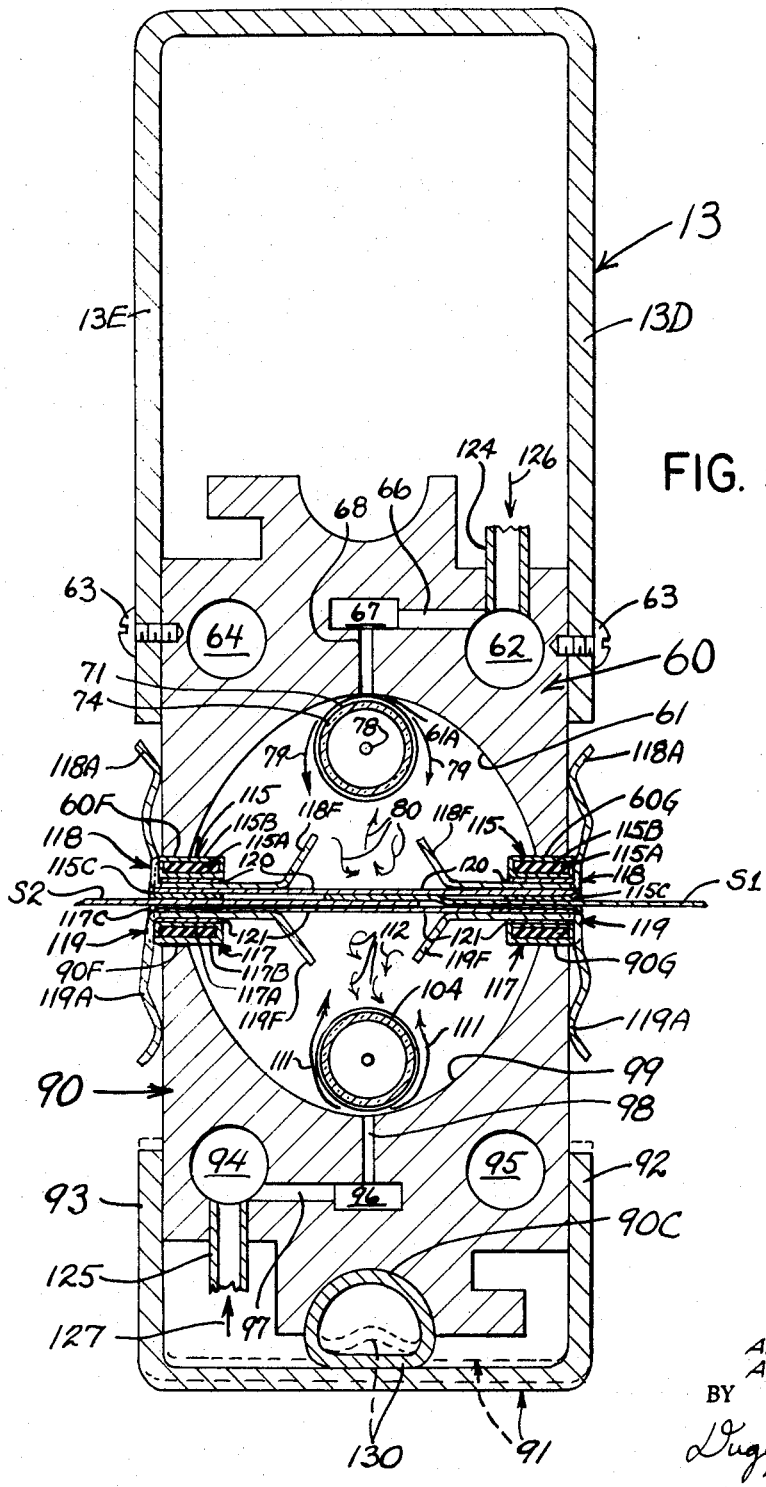
FIGURE 5 is an enlarged vertical sectional view of the apparatus shown in FIGURE 4, taken along the line and in the direction of arrows 5—5 of FIGURE 4.

FIGURES 2, 3, 4 and 5 illustrate in greater detail the devices by means of which the weld is accomplished. As illustrated in FIGURE 2, in which the parts are separated, the upper welding member 13 is a channel, opening downward. Between the sidewalls 13D and 13E of the channel 13 there is positioned an extruded aluminum lampholder and reflector generally designated 60 which is fastened between the flanges 13D and 13E by means of screws 63. The member 60 has a curved reflective under surface at 61 which may be parabolic, though not necessarily so. Surface 61 is highly polished. Also in the aluminum extrusion 60 there is an aperture 62 extending endwise through which an air supply is adapted to be provided with an air inlet at 124. In extrusion 60 there is another aperture 64, which in this particular instance is unused. The longitudinal aperture 62 is provided with one or more cross apertures 66 connecting to another longitudinal air manifold 67 through the extrusion. Then there are a plurality of small drill holes 68 at even spacings along the central portion of the extrusion, acting as air blast ports from manifold 67 to the approximate centerline of the curved reflective surface 61. These are shown in FIGURES 4 and 5. These apertures 68, of which there are many, serve to provide jets of cooling gas (or air) all along the central part of the curved reflecting surface 61.

At opposite ends of the extrusion 60 there are provided end housings 69 and 70, which are of insulating material. These housings serve to close off the ends of the apertures 62, 64 and 67 and close off the end of the reflective shape 61 down to surfaces 60F and 60G. An aperture at 71 is provided in the housing 69 and a similar aperture at 72 in the housing 70. These are aligned for receiving the quartz tube lamp 74, which passes through these apertures and has its ends and electrical terminals 75 and 76 situated within the housing 69 and 70 respectively, as shown in FIGURE 4. The quartz lamp is positioned by the housing 69 and 70 so that the incandescent filament 78 is correctly positioned with respect to the reflective surface 61 so that the desired concentration of heat energy in the usable area 12A of the device is accomplished. The outer surface of the quartz tube lamp 74 is very close to the reflective surface 61 but a little space is provided at 61A, see FIGURE 5, and therefore the blasts of cooling air which come down through the small apertures 68, all along the length of the quartz tube lamp. This cooling air circulates around the lamp, as shown by the arrows 79, and produces a condition of highly turbulent air as shown by the arrows 80, which will be referred to further. The electrical connections to the end terminals 75 and 76 are provided at 81 and 82, and may be taken out of the housings 69 and 70 by any suitable means. It will be noted that the housing 69 is closed by gasketed plate 69A and that the housing 70 is similarly closed by gasketed plate 70A, so that the housings become air pressure chambers. The housing 69 is provided with an air outlet 84 connected to the tube 85, and the housing 70 is likewise an air chamber provided with an outlet 86 which is connected to the tube 87.

The lower member for producing welding heat in the area 12A is shown generally at 90 and can be an aluminum extrusion identical with that shown at 60 for the member 13 but it is mounted for limited up and down movement. This aluminum extrusion 90 is placed so that it fits into a channel 91 having sidewalls 92 and 93 in which the extrusion is adapted to slide up and down. The extrusion 90 can be identical with that shown at 60, and hence contains an aperture 94 throughout its length which active air inlet 125 is connected and a similar aperture 95 which is unused. The extrusion 90 similarly contains the rectangular manifold 96 throughout its inlet which is connected to the aperture 94 by cross bores 97. Similarly there are a plurality of drill holes at spaced intervals along the length of the extrusion, extending from the manifold 96 to the reflective surface 99. Likewise, as shown in FIGURE 4, there is provided an insulating box at 101 which closes off one end of the member 90 and another box at 102 which closes off the other end, both boxes terminating at level of surfaces 90F and 90G. Apertures are provided at 103 for box 101 and at 107 for box 102 for positioning the quartz tube lamp 104, and the boxes are closed by gasketed covers 101A and 102A respectively so as to be airtight, and are provided respectively with outlet connections 105 for box 101 and 106 for box 102. The quartz lamp 104 is provided with an end terminal 107 in the box 101 and to which an electric lead 108 is attached and an end terminal 109 in the box 102 and to which electrical lead 110 is attached. These electric lead wires may be taken out of the boxes 101 and 102 through any airtight connections in the box wall. The boxes 101 and 102 hence position the quartz tube lamp 104 within the reflective surface 99 as shown in FIGURE 5, so that its filament is properly located with reference to surface 99. The lamp 104 is close to but does not quite engage the reflective surface 99, and hence gas under pressure, for example air, emanating through the apertures 98 circulate around the quartz tube lamp 104, as shown by the arrows 111, thus cooling the lamp and also the reflector 99, and producing a condition of extreme turbulence as shown by the arrows 112. The position of the lamps 74 and 104 with respect to the reflective surfaces 61 and 99 respectively is such as to concentrate the heat from the lamp filaments in the particular area 12A desired, centrally along the lengths of the reflective surfaces, and upon the lapped plastic strips S1 and S2, situated between them.

It will be noted that the extrusion 60 is provided with flat downwardly facing surfaces at 60F and 60G, and the extrusion 90 is likewise provided with flat upwardly facing surfaces at 90F and 90G and the end boxes of the extrusions provide similar surfaces across the ends of the extrusions. It is desired that the entire space within surface 61 above the level of surfaces 60F and 60G, and the space within reflector 99 and below the level of surfaces 90F and 90G be made into separate comparatively tight chambers. To accomplish this, there is provided around the perimeter of each of these surfaces a rectangular gasket generally designated 115 for the upper gasket against the extrusion 60 and generally designated 117 for the lower gasket against the extrusion 90. It will be appreciated that the boxes 69 and 70 which close off the ends of the extrusion 60 also form the end surface against which the gasket 115 seat, and similarly the boxes 101 and 102 which seal off the ends of the extrusion 90 likewise form the surfaces against which the ends of the lower gasket 117 seat. Each of these gaskets 115 and 117 is, as illustrated in FIGURE 5, composed of an inner gasketing material 115A, preferably of silicon rubber or a similar gasket material capable of standing comparatively high temperatures. This is preferably wrapped all around with a very thin aluminum sheet 115B which serves to protect it from the heat of the quartz lamp 74 located in extrusion 60. The lower gasket 117 for lower element 90 is similar, being composed of an inner gasket material 117A wrapped in aluminum sheet 117B. The aluminum wrap is preferably also carried down so as to form a clip around the diaphragm frames 118 and 119 which serve to mount the thin plastic diaphragms 120 and 121 respectively upon the elements 60 and 90.

The diaphragm carriers shown generally at 118 for the upper gasket carrier and 119 for the lower gasket carrier are rectangular frames shaped so as to lay upon the flat surfaces 60F and 60G (for upper element 60) and 90F and 90G (for lower element 90). Each frame is rectangular and also rests upon the end blocks 69 and 70 for element 60 and 101 and 102 for element 90. These frames have integral clips at 118A for frame 118 and 119A for frame 119 which grips the sides of their respective extrusions 60 and 90, and hold the diaphragm frames in place. These diaphragm frames thus extend around the perimeters of the reflective surface 61 for element 60 and 99 for element 90 which they cover. The frames extend somewhat across the open side of the reflective surfaces and have inturned fins at 118F—118F for frame 118 and 119F—119F for frame 119. However, there is a space between the fins through which the heat radiations from the lamp 74 (for element 60) and lamp 104 (for element 90) will pass, and in this space there is a condition of extremely turbulent air produced by the air jets into such space. Referring to FIGURE 5 especially it will be observed that the gasket wrapping 115B which is of thin aluminum extends down along the outside edge of the diaphragm frame and then extends at 115C along its lower surface. The reason for this is that this portion of the aluminum wrapping forms a clip serving to hold onto the frame 115 the thin sheet of plastic at 120 which forms the diaphragm. Similarly the sheet of plastic 121 for the gasket frame 119 is held by the clip formation of the aluminum wrapping at 117C.

The sheets of plastic 120 and 121 extend all the way across the frames 118 and 119 respectively and are wrapped (up or down) around the outer edges of the frames and are held in place by the clip formations 115C and 117C, respectively, of the gaskets. Accordingly, the gasket 115 seals the under surfaces 60F and 60G (and across end boxes 69 and 70) to the diaphragm sheet 120 which is wrapped up, all around the edges of the rectangular frame 118 and gasket 117 similarly seals from the surfaces 90F and 90G (and across end boxes 101 and 102) to the diaphragm sheet 121 which is wrapped down, all around the edges of the frame 119. Of course, the diaphragm sheets 120 and 121 and the flanges 115C and 117C of the gaskets are notched at the clips 118A and 119A.

Therefore, when the diaphragm frames 118 and gasket 115 are in place they serve to position the diaphragm sheet 120 in place, which then seals the space above surfaces 60F and 60G within the reflective surface 61, and this seal goes all the way around across the end boxes 69 and 70. There is accordingly provided a downwardly facing window and container space bounded by the reflective surface 61 and by the bottom diaphragm sheet of plastic 120, and lamp 74 is positioned within this space. Similarly the reflective surface 91 is closed by the upwardly facing plastic diaphragm sheet 121 which, by virtue of the construction is sealed to the end boxes 101 and 102, and lamp 104 is contained in this chamber. An air inlet at 124 leads into the unit 60 and inlet 125 leads into the unit 90. The airflow into the sealed space of unit 60 is through the tube 124 via arrow 126 and thence via channels 62, 66, 67 and bore holes 68 is distributed as jet against lamp 74 within the sealed space. The flow is thence as a turbulent flow via the arrows 79 and this flow applies a pressure against the plastic diaphragm sheet 120, causing it to tend to flex downwardly. A similar airflow occurs via the arrow 127 through the pipe 125 and channels 94, 97 and 96 and thence through the bore holes 98 as a distributed flow against the lamp 104, and within the sealed space and the flow continues via arrows 111 and applies pressure against and causes the plastic diaphragm sheet 121 to tend to flex upwardly. Therefore, when the upper heating element 13–60 is in the position shown in full lines in FIGURES 3 and 5, the plastic diaphragm sheet 120 faces towards the upwardly facing plastic diaphragm sheet 121 of the lower heating element 90, and the two heating elements form a clamp by which the plastic sheets at S1 and S2 are engaged. The upper unit 13–60 is held down by the screw 13B and by the end latch 58, 59, see FIGURE 1. The more air pressure that is introduced into the tubes 124 and 125 the greater will be the force exerted by the plastic diaphragm sheets 120 and 121 against the sheets of plastic between them.

To accomplish the weld, the lapped edges of the two sheets S1 and S2, which are to be welded together, are placed between the plastic diaphragms 120 and 121, and the machine is closed to the full line position as shown in FIGURE 3 and as shown in FIGURE 5, and equal air pressure is introduced via the tubes 124 and 125, and the plastic sheet 120 is flexed slightly downwardly and plastic sheet 121 is flexed slightly upwardly thus clamping the two sheets S1 and S2 which are to be welded, firmly against each other. Any air which may be entrained between the lapped sheets S1 and S2 is squeezed out and it flows out along the surfaces of the sheets through any edge interstices that are available, and the sheets S1 and S2 thus firmly pressed together are ready to have heat applied. The lamps 74 and 104 are then energized, as previously described, for a time sufficient to bring the lapped edges of the sheets S1 and S2 into a condition of incipent fusion, and the pressure applied by the diaphragms forces them together and causes them to become welded into one piece at the lap.

It might be thought that the heat of the lamps 74 and 104, being imposed against the plastic diaphragm sheets 120 and 121 would cause them also to melt, but we have found that these diaphragm sheets 120 and 121 can be made of precisely the same material which is being welded at S1 and S2 and yet not melt. This is because the sheets 120 and 121 can be kept cool. This is accomplished as follows: The air pressure entering as the flows 126 and 127 is evenly distributed along the length of the lamps 74 and 104 and circulates around the lamps as previously described. This airflow, however, does not come to rest in the sealed chambers but goes out of the chambers in which the lamps are contained, through the apertures 71 and 72 for the lamp 74 and thence into the boxes 69 and 70 respectively. These apertures 71 and 72 are loose enough so as to permit the desired airflow. Accordingly, the airflow will pass from chamber 60–120 to end boxes 69 and 70 and then through pressure connections 84 and 86 for the boxes 69 and 70 respectively. Similarly, the airflow around lamp 104 passes through apertures at 103 for the end box 101 and 107 for the end box 102 and then passes out through the air connections 105 and 106. Hence, the air pressure which serves to press against the diaphragms 120 and 121 respectively and cause them to flex and squeeze the lapped sheets S1 and S2 being welded, not only accomplishes this purpose of applying pressure but also the flow of air is of sufficient volume so that the air acts as a cooling flow to maintain the diaphragm sheets 120 and 121 cool. The cooling effect is enhanced by turbulence as shown by the arrows 80 within the upper heating device 60–120, and as shown by the arrows 112 within the lower heating device 90–121. This turbulent flow through each chamber sufficiently cools the plastic diaphragm sheets 120 and 121, respectively, so that they do not reach a temperature of fusion, and they thereby maintain their mechanical integrity even though they may be composed of a plastic material which is the same kind as sheets S1 and S2. Therefore, the air supply and flow, as described, not only serves as a source of pressure, it also serves as a cooling flow.

As previously noted, the extrusion 90 is not fastened to the channel 91 but merely slides up and down in it. At the lower portion of the extrusion 90 there is a curved exterior surface at 90C, and along this curved surface, which is a downwardly opening groove in the member 90, there is provided an expandable air bag in the form of a closed-end rubber tube 130, which in its undeflected condition will permit the extrusion 90 to settle into the channel 91 to the dotted line position as shown in FIGURE 5. The air bag 130 is closed at its ends, and is provided with an inlet connection at 131, see FIGURE 6, and when pressure is applied to it, it expands and pushes the extrusion 90 bodily upwardly with reference to the channel 91 which is solidly mounted on frame 12. A layer of heat insulation may be interposed between the air bag 130 and inlet 90, if desired.

The sequence of operation for preparing for the weld therefore includes first positioning the strips S1 and S2 as shown in FIGURE 1. Then the screw 13B is actuated so as to bring the upper heating member 13–60 downwardly to the full line position shown in FIGURE 3 and as shown in FIGURE 5 and then the latch 60–61 is operated and the whole machine is accordingly in a preliminary position preparatory to making the weld. A suitable interlock switch 133 see FIGURE 4, may be operated by latch 59 upon entering aperture 58 to control the operating circuits as already mentioned. Then by suitable solenoid valve, air is injected into the air bag 130, see FIGURE 5, and this moves the extrusion 90 upwardly thereby applying heavy pressure from the surface 90F–90G upwardly through the gasket 117 and frame 119 against frame 118 and gasket 115 against surfaces 60F and 60G of the upper heat unit. This preliminary squeezing pressure seats the gaskets 117 and 115 firmly in place so that when air is later on introduced at pipes 124 and 125, it will not leak out between the plastic diaphragm sheet 120 and the edges 60F and 60G of the upper unit 60 and 120 will not leak out between the plastic diaphragm sheet 121 and the lower edges 90F and 90G of the lower unit 90.

Referring now to FIGURE 6 there are illustrated the air and electrical circuits for operating the machine of FIGURES 1–5. Those portions of the circuits within the dotted rectangle 135 can conveniently be placed in the base support 11 while those within the dotted rectangle 136 are the portions of the actual lap welding machine from the base 12 and including the movable upper heater elements 13. An air connection at 137 is made to the machine air inlet connection at 138 and the air then passes through the filter 139 to the distributing line 140. One circuit extends down at 141 through a regulator 142 and gauge 143 to the solenoid operated valve 144 operated by the circuit 145 of timer 153 to L2. When the solenoid valve is energized air pressure is applied to the line 146 in an amount shown by the gauge 143 and may be varied by regulator 142. Line 146 connects via the line 131 to the air bag 130, which serves to lift the arrows 147 against the unit 90 of the lower heating element, thus pushing it upwardly against the unit 60 of the upper heating element, as previously described. The electrical connections 81 and 108 of the lamps 74 and 104 respectively are made to line L2 and the connections 82 and 110 of the lamps are made to terminal 163 of the timer switch 153. The timer 153 is the same one which operates the solenoid valve controls. The air connections at 105 and 106 from the end boxes 101–102 of the lower heating element, unit 90 are connected to a manifold 148 and similarly the air connections 84 and 86 from the end boxes 69 and 70 of the upper heating element, unit 60 are connected to the same manifold 148. The manifold 148 thus serves to equalize the outflowing pressures from both ends of both heating units. The air outflow is via the line 149 through a throttle valve 150 which is adjustable and through an exhaust muffler 151 and hence to atmosphere via arrow 152. The air inflow is from line 140 via line 154 and regulator 155 through gauge 156 and solenoid valve 157 (which is controlled by the circuit connected to timer terminal 158) and then to the common connection 160, and thence from this common connection via the lines 124 and 125 into the upper and lower heating elements, respectively. Similarly, air will pass from line 140 via line 161 and regulator 162, gauge 164, solenoid valve 165 (controlled by the circuit to timer terminal 166) and line 167 to the same common connection 160 and thence via the same two lines 124 and 125 to the upper and lower heating elements, respectively. Accordingly, the common line 160 and lines 124 and 125 equalize the pressure applied to the sealed spaces of the upper and lower heating elements and this prevents any excess of pressure being applied to the diaphragm sheets 120 and 121, the pressure being completely equalized. Regulators 155 and 162 can be adjusted as desired and one may be adjusted to provide flow at a lower pressure than the other. The timer 153 has feed lines L1 and L2, "start" and "off" buttons for initiating and stopping the cycle of operation, and "LH" (left hand) and "RH"

(right hand) control buttons. Not shown are regulators for varying the various components of time in the cycle and interlocks with, for example, switch 133, and the motor controls for raising and lowering unit 13, all of these being usual.

Thus referring to FIGURE 7, there is illustrated a timing diagram of an exemplary welding cycle. This timing diagram shows the timing sequence beginning at time 168 after the upper welding device 13–60 is lowered to the position shown in FIGURE 3, against the lower heating device 90, preparatory to welding, and after the clamp 58–59 has been put in place which through interlocks, allows application of power for proceeding. When time 168 occurs all of the preliminary circuits are then satisfied and the timing cycle as shown in FIGURE 7 may proceed. According to this timing cycle at some time before the actual welding cycle begins, as at 168, the "start" button is pushed and timer 153 is energized but does not yet run, but circuit 145 is energized and air pressure is introduced via lines 146–131 to the air bag 130, and the lower heating element, unit 90 is raised against the upper heating element, unit 60, thereby applying a pressure of say 75 p.s.i. to the air bag, and this pressure continues throughout the entire welding cycle, until the cycle is completed. Accordingly, circuit 145 remains energized until the cycle is complete. Then to initiate the timer operation, buttons LH and RH are operated, timer 153 starts, and this is at time zero. The timer energizes the lamp circuit 163 thereby applying energy via the lamps and this continues until the point 170 in the timing diagram, FIGURE 7, after which the lamps are de-energized and cool off and heating is discontinued at 171. A typical heating cycle may be 17 or 18 seconds. Simultaneously with the energization of the lighting circuit 163 the timer energizes circuit 158 and solenoid valve 157 operates, and this occurs at 172 in the timing cycle, FIGURE 7. The regulator 155 is adjusted so as to supply pressure at a selected lower pressure, and accordingly sends such lower pressure through the then open valve 157 and via line 159 to the common line 160, and thence via the line 124–125 into the upper and lower heating devices 60 and 90, and the flow occurs through these chambers and thence out via the lines 84, 86, 105 and 106 into the manifold 148 and through line 149 and out at 150 and out through the exhaust muffler 151 to atmosphere. The throttle valve 150 is adjusted for a certain airflow and it and the regulator 155 thereby determine the pressure at 172, see diagram FIGURE 7, which is applied within the chambers of the heating devices, against the diaphragms 120 and 121, and hence the pressure initially applied to the lap weld. This pressure does not back up through the valve 165 since it is then closed. At some intermediate period in the lap welding cycle as at 174 in FIGURE 7, preferably shortly before the heating lamps are de-energized, the solenoid 165 is energized by operation of the timer energizing circuit 166. An exemplary time might, for example, be at thirteen seconds in FIGURE 7. Pressure is then applied at time 174 via the then open valve 165 and since regulator 162 provides a higher pressure the pressure will increase to the valve at 175 of FIGURE 7. Valve 157 is then simultaneously closed because timer 153 de-energizes circuit 158. This higher pressure via line 167 is then imposed via the common connection 160 and lines 124 and 125 to the chambers of each of the heating units 60 and 90 and the airflow continues at an increased rate through these lamps, and out through the manifold 148 and the exhaust circuit to atmosphere at 152, and a greater pressure is simultaneously applied against the flexible diaphragms 120 and 121 thereby pressing with greater pressure the lapped ends on the sheets S1 and S2 against each other for completing the weld. This pressure continues until 176, FIGURE 7, which is well beyond the time at 170, when the lamps are de-energized, and then the circuits 145 and 146 are simultaneously de-energized as at 176 and the cycle is completed at 177 after the air exhaust from the system. With all of the circuits 145, 158 and 166 de-energized, the latch 60–61 is moved and interlock switch 133 is operated and through circuits, not shown, then permits the energization of the motor circuit, not illustrated, for rotating the screw 13D, for elevating the upper heating element 13, and the welded together lapped ends of the plastic sheets S1 and S2 may then be removed from the machine.

In the embodiment of the invention illustrated FIGURES 8–16 is constructed and operates on essentially the same principles as that shown in FIGURES 1–2, except that it is made much smaller and is fitted into a pistol-like handle so that it can be hand held. Also in this machine a piston arrangement replaces the air bag 130 and motor screw 13B of the FIGURES 1–5 embodiment and serves to translate the heater units from "open" to "closed" positions; all controls are remote and a simplified hinged plate device is used to mount the diaphragms and serves as a clamp for the ends of the plastic strips to be welded. By these expedients and suitable adjustment of the remote timer and controls a somewhat different cycle of operation can also be achieved.

In the machine of FIGURES 8–14 the devices for mounting the pressure diaphragms, which in the embodiment of FIGURES 1–6 are the gasketed frames 118–115 and 119–117, are in the embodiment of FIGURES 8–14, replaced by a clamp device shown in FIGURES 14–15. In this clamp two plates 190 and 192 are hinged at 191 so they can be "opened" as in FIGURE 14 or "closed" as in FIGURE 15, in which latter position they can be drawn down tight against each other by screws 193—193 so as to clamp between them the lapped ends of strips S1 and S2 which are to be welded. The plates have matching rectangular apertures 195 for plate 190 and 196 for plate 192, these apertures being so located as to be juxtaposed in the "closed" position of FIGURE 15 and the apertures are of a size to correspond to the maximum dimensions heated by the heating units which are to be described. Plate 190 has a fingerhold at 194 and both plates are matched as shown at 190A and 192A, the hinge being interrupted at the notch. Between the notches the plates are cut back to provide edges 190B and 192B. The notches and edges 190B and 192B help align and locate the whole clamp device of FIGURES 14 and 15 when it is placed in the welding machine of FIGURES 8–13.

Each window 195 and 196 has a recessed margin on the outer surfaces of the plates 190–192 and all around the windows. One such recessed margin is shown at 196A for plate 196. Plate 195 is similar, the recessed margin being at 195A on the bottom side. Across each window 195 and 196 and resting on these recessed margins there is laid a rectangular sheet of plastic as at 198 for plate 196 and 199 for plate 195 and over these are laid rectangular gaskets 198A and 199A shaped to overlie the marginal areas. The gaskets per se, are preferably wrapped in thin aluminum sheet as for the gaskets 115 and 117 of the embodiment of FIGURES 1–6, to protect the gasket material from excessive heat. The clamp configuration of FIGURES 13–15 therefore provides a means for clamping the strip ends S1 and S2 and provides aligned apertures of the size of the welding area and each aperture above and below the strips S1 and S2 has a plastic diaphragm sheet across it, and the peripheries of the plastic diaphragms are covered by gaskets, which are presented on the outer faces of the clamp, one facing down and the other up, when the clamp is closed, and the gaskets are of a size, as will be apparent from FIGURE 13 to rest on the downwardly and upwardly directed margins respectively of the opposed heat lamp units 200 and 201 and seal thereagainst.

Referring now to FIGURES 8–13, the hand held machine includes a frame generally 180, having a rear portion 181, a pistol grip portion 182, and an underframe projection 184. On opposite faces of the frame there are attached by screws 187 identically shaped parallel side-plates 185 and 186 (see FIGURES 8, 9 and 11), defined as for plate 185 and as shown in FIGURE 8, by the locations 185A–185H. The line between positions 185E and 185F and the line between positions 185H and 185G are parallel and spaced apart by dimension T and define a narrow slot 188 terminating open at the left in FIGURES 8 and 9 and terminated at the right at line 189. This slot is of a vertical height to receive with moderate clearance the thickness T of the clamp when it is closed as in FIGURE 15. The width Y where the hinge 191 is interrupted (from 191A to 192A) corresponds to the outside-to-outside dimension Y of plates 185 and 186 of FIGURE 11, and the slots 190A are of a depth (from the hinge) so that when the clamp as a whole is pushed edgewise fully into the slot 188 until surface 190B–192B of the clamp (FIGURES 13 and 14) engages edge 189 of plates 185–186 (see FIGURES 8–9) a part of slots 190A of the clamp will embrace the edges of the side plates and perfectly locate the clamp, and in such position hinge 191 will be at the location shown in dotted lines in FIGURES 8 and 9, and the apertures 195–196 of the clamp will be located properly aligned in slot 188 directly between the active area of the heater lamps, now to be described.

Between spaced parallel plates 185 and 186 there are located heater units generally designated 200 (upper) and 201 (lower). These are identical hence only one need be described in detail. Heater 200, the upper, is fixedly attached between plates 185 and 186 by screws 202 and radiates heat downward to slot 188 over a rectangular area of length K (FIGURES 8 and 9) and width W (FIGURE 13). Heater 201, the lower, is mounted for vertical sliding movement between the plates 185 and 186. It is moved up by a piston and is retracted by hand manipulation and radiates heat upwardly toward slot 188 over the same rectangular area K x W.

All of the specific descriptions for heater 201 will be understood to apply equally to identical heater 200. As shown in FIGURES 8 and 9, the heater 201 is composed of a central extruded channel 204 of length K, having a channel-shaped reflective surface 205 into which wedge cross-sectioned strips 206 are inset and attached by screws, see FIGURES 11 and 13. The exposed surfaces of the channel 205 and strips 206 are bright plated. The extrusion 205 has longitudinal channels 207, 208 and 209.

From channel 207 cross-drilled holes 210 extend to the centerline of surface 205 where they form a series of spaced ports. To the end surfaces of the extrusion 204 there are attached by screws, not shown, boxes 211 and 212 having gasketed removable covers 214 and 215, attached by screws. Within the boxes 211 and 212 respectively are attached the lamp terminal posts 216 and 217 and the box bosses are respectively apertured at 218 and 219 to receive therethrough with clearance sufficient to allow air-escape, the tubular quartz heater lamp 220. The terminal wires L1 and L2 of the lamp are connected to lead wires at the posts.

Boxes 211 and 212 have no channels to align with channel 207 of the extrusion 204, but each box does have channels as at 208' for box 211 and 208" for box 212 to align with channels 208 of the extrusion (see FIGURE 9) and 209' for box 211 and 209" for box 212 to align with channel 209 of the extrusion (see FIGURE 9). Channel 208' is fitted with tube coupling 221 and 208" is closed by screw plug 222 (FIGURE 9) and channel 209' is fitted wtih tube coupling 221' and 209" is closed by screw plug 225 (FIGURE 10). A cross bore 226 connects channel 208' with the interior of box 211 and cross bore 227 connects channel 208" with the interior of box 212. A cross channel 228 (see FIGURE 8) cut in the base of box 211 where it fits against the end of extrusion 204, connects channel 209' and channel 207 and cross bore 229 which is plugged leads from channel 209" into the interior box 212.

Pistol grip 182 has a center bore 230 to receive a multiple conductor cable 231; a channel 232 for supplying pressure and ventilating air leading all the way up to the top of frame portion 181 where it is plugged at 243 and channel 235 which connects through cross bore 236 with cylinder 237. This cylinder is of rounded corner rectangular configuration and is milled out of the underframe member 184. Piston 238 fitted wtih O-ring 239 works up and down in cylinder 237 and supports the flat underside of the heater assembly 201. Finger pieces 240 (see FIGURE 11) are attached by screws 241 through slots 242 fastened into the extrusion 204 and permits the user to push heater assembly 201 downwardly to retract it and piston 238 to open condition at slot 188. A strap 243 attached to side plates and extending up in a groove under the finger pieces, goes down under frame 184 to prevent its downward deflection when air pressure enters cylinder 237.

In portion 181 of the handle there is a port 244 (plugged) from the space between side plates 185–186 to channel 232 and at the upper end of the same channel below top plug 234, there is a connecting cross channel 245 (see FIGURES 8 and 12), having an opening closed by screw plug 246 and beneath the plug a coupling 247. This channel 245 has pressed into it a connection 248 of upper heater 200, which precisely corresponds in function with air channel 209'–209–209" of lower heater unit 201, and flexible tube 248 which connect couplings 247 and 224 together (FIGURE 8) puts these two portions of the machine in parallel for functional operation.

Referring to FIGURES 9 and 12 in the upper part 181 of the frame there is another parallel channel 249 which leads down from the top where it is plugged at 250 to the bottom 251, FIGURE 9. Slightly above bottom 251 there is a sealed port 252 leading into recess 254 in the frame. Near the top of channel 249 there is a cross bore 255 plugged at outer end by a plug (not shown) and channel 255 leads into the interior space between side plates 185–186. A needle valve 257 intercepting this cross channel 255 permits adjustable throttling outflow therethrough. From the upper end of passageway 249 (FIGURES 9 and 11) there is a connecting passageway 258 having an upper opening thereto closed by plug 259 and a coupling 260 just below the plug. This channel 258 has pressed into it a connection 260' of upper heater 200, which precisely corresponds in function with passageway 208'–208–208" of lower heater unit 201 and flexible tube 261 which connects couplings 260 and 221 together (FIGURE 9) puts these two portions of the machine in parallel for functional operation.

In the embodiment of the invention of FIGURES 8–11 the channels, ports and tubes are used to conduct the air (or other gas) used for the clamping pressure and for diaphragm pressure and cooling and also uses some of these channels, ports and tubes as conduits for the electrical connections that go to the quartz heater lamps. The air and wiring paths are as follows: Into the pistol grip handle air under pressure at channel 232, FIGURE 8, flows past the pressure sealed side port 244 where two electrical leads, i.e. separats L1 leads for the upper and lower heater lamps, enter into the passageway 232, and then the air and the wires continue up, to cross bore 245 where part of the air and one L1 lead wire go down through coupling 247, flexible tube 248, coupling 224 and enter channel 209'. The air then separates and flows its own way through cross channel 228 to channel 207, thence out drill holes 210 and blows around heater lamp 220 and presses against lower diaphragm 198 in clamp, FIGURES 14 and 15. The lead wire L1 passes through channel 209 but the sealing compound in the channel blocks airflow and L1 then goes through channels 209" and 229 (which is also sealed) and to terminal 217 and thence to the L1 terminal of lamp 220.

The diaphragm pressure and cooling airflow into the lamp chamber of heater 201 which is, of course, sealed by the diaphragm stretched across the edges of extrusion 204 and the tops of boxes 211 and 212, then passes out through heater lamp holes 218 and 219 into boxes 211 and 212. Just as in the embodiment of FIGURES 1–6, it is desired that this flow through the two boxes 211 and 212 be united and then united with the corresponding flow from heater unit 200, and this is accomplished. The return flow from the boxes 211 and 212 passes down via cross channels 226 and 227, FIGURE 9, and thence via channel 208''–208–208', coupling 221, tube 261 and coupling 260 to cross channel 258, where it meets and unites with a like flow via tube 260 from heater unit 200, and the total outflow continues via 249, cross channel 255, valve 257 to atmosphere, and the outflow is adjusted by the valve. Hence equalization of pressure of diaphragm 198 of chamber 201 and of diaphragm 199 of chamber 200 (see FIGURE 13) both going to and coming from the diaphragms is achieved.

The two separate L2 lead wires for the lamps of the upper and lower heater units 200 and 201 enter via sealed port 252 near the bottom 251 of passageway 249, see FIGURE 9, and extending up passageway 249 and through another seal 265 (see FIGURES 9 and 12) bend into cross channel 258, FIGURE 9, and then one of the L2 wires goes through tube 260 to the heater lamp of the upper heater unit 200 and the other L2 wire extends down through connector 260, tube 261, connector 221 into passageway 208', up through cross bore 226 into box 211 and via terminal post 216 to the L2 terminal of lamp 220.

The controls of the FIGURES 8–15 pistol grip embodiment of the invention can be as described with reference to the embodiments of FIGURES 1–6 except that they are remotely located and connected to the hand unit via hoses 266 and 267 and electrical cable 231. The cycle can be as previously described, or if desired, can be somewhat simplified by omitting the lower pressure inlet circuit, units 154–159, FIGURE 6. What is then done is to re-adjust timer 153 so as to provide a cycle illustrated in FIGURE 16, as follows: The ends of plastic strips S1 and S2 are placed in the clamp arrangement, FIGURES 14–15, and the clamp inserted in the unit, FIGURES 8–13. Then switch 268 (FIGURES 8, 9 and 12) is closed to energize timer 153, FIGURE 6, which as re-adjusted as to timing simultaneously energizes at time zero, FIGURE 16, the upper and lower heater lamp via lines L1 and L2 and also energizes solenoid 165, via terminal 166, and air for a full flow (at regulator 162) is then admitted via tube 167 to tube 266 (FIGURE 8) and flows into the heater lamp chambers and against the diaphragms across said chambers. This flow flexes the diaphragms but only a low level of pressure is exerted against the diaphragms at this time since there is, at this time, some leakage between the diaphragms and the edges of their respective lamp chambers due to lack of clamping force via piston 238, FIGURES 8 and 9. Then at some later time 270 (see FIGURE 16) say at 12 seconds, the timer 153, FIGURE 6, energizes solenoid 144 via terminal 145, and flow, regulated at 141 occurs via tubes 131 (FIGURE 6) and 267 (FIGURE 8) and is introduced under piston 238, which raises, and clamps the two light units 200 and 201 tightly against their diaphragm gaskets and the leakage ceases thus causing the pressure to build up at 271, FIGURE 16, until it reaches full regulated pressure at 272. The timer may de-energize the L1–L2 heater lamps at 274 while clamping pressure at 275 and diaphragm pressure at 276 continue until 277 when the timer de-energizes the solenoids and the pressures fall to zero and the operation is complete.

If desired, however, the full cycle of FIGURE 7 may be utilized in the embodiment of FIGURES 8–15 using the circuit diagram of FIGURE 6.

It will be noted that the thickness of the supporting frames 190 and 192 at the windows 195–196 inevitably cause some stretching of the diaphragms 198 (lower) and 199 (upper) when air pressure is applied against them. This stretching is accommodated by the elasticity of the plastic sheeting used for the diaphragms and is desirable because it decreases the likelihood of wrinkling in the diaphragms.

In the present invention the plastic sheets which are lap sealed together may have components, such as conductors or electrical devices such as condensers or sensors positioned along the lap between the plastic sheets, which when pressed together will encapsulate the conductors, sensors, etc. Also, more than two plastic sheets may be sealed together.

The dimensions and shape of the area in which sealing is accomplished, i.e. area 12A of FIGURE 1 and area K x Y of the device of FIGURES 8–16 may, of course, be varied. If greater width of lap is desired two or more lamps may be positioned side-by-side, top and bottom so as to increase the width of lap, and in such event the surfaces 60F (or 60G) of the contiguous lamps are made narrow and made somewhat lower and a common diaphragm is then stretched across all of the lamps of the battery with contact of the diaphragm only on the outermost surfaces 60F (or 60G) of the battery of lamps and, of course, along the end boxes of the lamps in the battery.

What is claimed is:

1. An apparatus for welding plastic sheets together comprising antrum-shaped light chambers each having an opening thereinto, said openings being alike and defined by peripheral edge in a plane, a diaphragm of pressure tight-plastic sheet material capable of transmitting heat radiations mounted in sealed relationship across and in the plane of the opening of each light chamber for thereby closing the chamber, each chamber having an inlet thereinto for applying fluid pressure to the chamber and against the diaphragm thereof, a heat source for producing high intensity heat radiations in each chamber for directing heat radiations emitted therefrom outwardly through the diaphragm of the chamber, means mounting said chambers for movement to and from a position where the diaphragms are facing each other for clamping engagement with each other, and means for introducing pressure through the inlet of each chamber for flexing the diaphragm of each chamber into pressure engagement with each other and means for energizing said heat sources.

2. The apparatus of claim 1 further characterized in that the inlets of the chambers are connected together for equalizing the pressure applied to the chambers.

3. The apparatus of claim 1 further characterized in that each chamber has an outlet and that the outlets of the chambers are connected together to form a common outlet.

4. The apparatus of claim 3 further characterized in that the common outlet is provided with a restriction for limiting the flow therethrough.

5. The apparatus of claim 1 further characterized in that each chamber has an outlet and that the inlet and outlet of each chamber are so disposed as to direct a flow therethrough against the heat source therein for cooling it.

6. The apparatus of claim 1 further characterized in that each chamber has an outlet and that the inlet and outlet of each chamber are so disposed as, with the shape of the chamber to provide a flow of fluid against the diaphragm for cooling it.

7. The apparatus of claim 1 further characterized in that each chamber has an outlet and that the inlet and outlet of each chamber are so disposed as to provide a flow of fluid over the heat source and then as a turbulent flow against the diaphragm for cooling it.

8. The apparatus of claim 1 further characterized in that baffle means are provided within each chamber for causing the flow of fluid against the diaphragm to be turbulent in the vicinity of the diaphragm.

9. The apparatus of claim 1 further characterized in that the diaphragm of each chamber has a coating thereon to minimize adherence of the diaphragm to a plastic against which it is pressed.

10. The apparatus of claim 1 further characterized in that said means mounting said chambers comprises a hollow frame having a flat top forming a work surface and one of the chambers is the lower chamber and is mounted in said frame with the opening substantially level with said top, and the other chamber is the upper chamber and is mounted on the hollow frame in downwardly facing direction over the lower chamber.

11. The apparatus of claim 1 further characterized in that said means mounting said chambers includes means for pressing the peripheral edges of the openings against each other.

12. The apparatus of claim 1 further characterized in that gasket means is provided between the diaphragm of each chamber and the peripheral edge of the opening covered by the diaphragm.

13. The apparatus of claim 1 further characterized in that the diaphragm of each chamber is detachably secured to the peripheral edge of the opening of such chamber.

14. The apparatus of claim 1 further characterized in that each chamber is provided with a detachably frame having the diaphragm detachably secured to the frame and a gasket is provided between the frame and peripheral edge of the chamber for sealing the diaphragm with respect to said edge.

15. The apparatus of claim 1 further characterized in that there is provided a hinged frame having frame pieces hinged together for movement toward and away from each other, said frame pieces being provided with apertures which are aligned when the frame pieces are hingedly swung together, diaphragms detachably secured across the aperture of each frame piece, said hinged frame being shaped so that it can be disposed between the chambers with the diaphragms in registry with the openings of the chambers.

16. The apparatus of claim 1 further characterized in that means are provided for increasing the pressure applied to the chambers while the heat sources are energized.

17. The apparatus of claim 1 further characterized in that means are provided for de-energization the heat sources of the chambers before the application of pressure thereto is discontinued.

18. The apparatus of claim 1 further characterized in that the diaphragms are composed of plastic material of the same kind of plastic as the plastic sheets to be welded together.

19. The apparatus of claim 1 further characterized in that the means mounting the chambers is a hand held frame.

20. The apparatus of claim 19 further characterized in that the hand held frame is provided with a pistol grip.

21. The apparatus of claim 19 further characterized in that the hand held frame includes control means connected to remote mechanism for timing energization of the heat sources, introducing pressure into said chambers and for translating said chambers relative to each other.

22. The apparatus of claim 1 further characterized in that said means mounting said chambers translates said chambers toward and away from each other while maintaining the planes of the diaphragms substantially parallel with each other.

23. The apparatus of claim 22 further characterized in that screw means is provided for upward and downward translation of the upper chamber.

24. The apparatus of claim 22 further characterized in that latch means is provided for holding the upper chamber close to the hollow frame when the upper chamber is in its lower position.

25. The apparatus of claim 22 further characterized in that the lower chamber is mounted for translatory movement up and down through a small range with reference to the work surface of the hollow frame.

26. The apparatus of claim 22 further characterized in that remotely located cyclical timer means is provided for timing introduction of pressure into each chamber and for timing energizing the heat sources and for timing translating said chambers toward and away from each other and for terminating each cycle.

27. The apparatus of claim 26 further characterized in that means is provided for initiating cycles of timer operation.

References Cited

UNITED STATES PATENTS

| | | | |
|---|---|---|---|
| 2,466,735 | 4/1949 | Piazze | 156—583 X |
| 2,859,796 | 11/1958 | Taunton | 100—211 X |
| 3,247,041 | 4/1966 | Henderson | 156—272 |
| 3,383,265 | 5/1968 | Garabedian | 156—382 X |
| 3,291,963 | 12/1966 | Wetzel | 156—583 X |

HAROLD ANSHER, Primary Examiner

JOSEPH C. GILL, Assistant Examiner

U.S. Cl. X.R.

100—211; 156—157, 272, 311, 380, 498, 499, 502, 579, 580